United States Patent
Lu et al.

(10) Patent No.: US 10,798,620 B2
(45) Date of Patent: Oct. 6, 2020

(54) COMMUNICATION METHOD IN HANDOVER PROCESS AND APPARATUS

(71) Applicant: HUAWEI TECHNOLOGIES CO., LTD., Shenzhen (CN)

(72) Inventors: Wei Lu, Shanghai (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/192,808

(22) Filed: Nov. 16, 2018

(65) Prior Publication Data

US 2019/0090167 A1    Mar. 21, 2019

Related U.S. Application Data

(63) Continuation of application No. PCT/CN2016/082221, filed on May 16, 2016.

(51) Int. Cl.
*H04W 36/08* (2009.01)
*H04W 36/00* (2009.01)
(Continued)

(52) U.S. Cl.
CPC ... *H04W 36/0061* (2013.01); *H04W 36/0016* (2013.01); *H04W 36/0022* (2013.01);
(Continued)

(58) Field of Classification Search
CPC ......... H04W 36/0061; H04W 36/0016; H04W 36/08; H04W 36/0022; H04W 36/0033; H04W 88/16; H04W 92/20
See application file for complete search history.

(56) References Cited

U.S. PATENT DOCUMENTS 10,299,184 B1 * 5/2019 Malhotra .......... H04W 36/0055
2005/0273668 A1   12/2005 Manning
(Continued)

FOREIGN PATENT DOCUMENTS

CN   102272720 A   12/2011
CN   103430516 A   12/2013
(Continued)

OTHER PUBLICATIONS

Michael Till Beck et al., "Mobile Edge Computing: A Taxonomy", AFIN 2014 : The Sixth International Conference on Advances in Future Internet, ISBN: 978-1-61208-377-3, 2014, total 7 pages.
(Continued)

*Primary Examiner* — Julio R Perez
(74) *Attorney, Agent, or Firm* — Kilpatrick Townsend & Stockton LLP

(57) ABSTRACT

Embodiments of the present invention provide a communication method in a handover process and an apparatus. The method includes: when a terminal is handed over from a source access network device to a target access network device, obtaining, by a gateway device, address information of the target access network device; obtaining, by the gateway device, address information of a Mobile Edge Computing MEC network element; and sending, by the gateway device, the address information of the target access network device to the MEC network element based on the address information of the MEC network element, so that the MEC network element modifies stored address information of the source access network device to the address information of the target access network device.

12 Claims, 9 Drawing Sheets

(51) Int. Cl.
*H04W 92/20* (2009.01)
*H04W 88/16* (2009.01)

(52) U.S. Cl.
CPC ....... *H04W 36/0033* (2013.01); *H04W 36/08* (2013.01); *H04W 88/16* (2013.01); *H04W 92/20* (2013.01)

(56) References Cited

U.S. PATENT DOCUMENTS

| | | | |
|---|---|---|---|
| 2011/0270946 A1 | 11/2011 | Shimamura | |
| 2013/0102270 A1* | 4/2013 | Suh | H04W 12/00 455/404.1 |
| 2013/0336286 A1 | 12/2013 | Anschutz | |
| 2014/0348131 A1* | 11/2014 | Duan | H04W 36/30 370/331 |
| 2015/0163655 A1 | 6/2015 | Yang et al. | |
| 2015/0215838 A1* | 7/2015 | Li | H04W 12/04 370/331 |
| 2015/0365819 A1 | 12/2015 | Zhu et al. | |
| 2019/0090167 A1* | 3/2019 | Lu | H04W 36/0022 |
| 2019/0306789 A1 | 10/2019 | Wu et al. | |

FOREIGN PATENT DOCUMENTS

| | | |
|---|---|---|
| CN | 105491625 A | 4/2016 |
| EP | 2736282 A1 | 5/2014 |

OTHER PUBLICATIONS

Yun Chao Hu et al., "Mobile Edge Computing a key technology towards 5G",ETSI White Paper No. 11, First edition—Sep. 2015, ISBN No. 979-10-92620-08-5, total 16 pages.

Fabio Giust: NEC Europe Ltd: "MEC Mobility Management;MEC(15)000165_MEC-mobility-management", ETSI Draft; Jul. 14, 2015, pp. 1-10, XP014250180.

\* cited by examiner

COMMUNICATION METHOD IN HANDOVER PROCESS AND APPARATUS

CROSS-REFERENCE TO RELATED APPLICATIONS

This application is a continuation of International Application No. PCT/CN2016/082221, filed on May 16, 2016, the disclosure of which is hereby incorporated by reference in its entirety.

TECHNICAL FIELD

The present invention relates to the field of communications technologies, and in particular, to a communication method in a handover process and an apparatus.

BACKGROUND

To enhance service experience of a user, a Mobile Edge Computing (MEC for short) network element can be deployed near an access network. The MEC network element has calculation and storage capabilities, can obtain a data packet of a terminal, and route the data packet after processing the data packet.

The MEC network element may be connected in series to an S1 user plane (S1-U for short) interface between an evolved NodeB (eNB or eNodeB for short) and a serving gateway (S-GW for short), and there is an interface between the MEC network element and the S-GW. When the terminal moves between the eNBs, there is no related solution for the MEC network element to deal with handover of the terminal currently.

SUMMARY

Embodiments of the present invention provide a communication method in a handover process and an apparatus, so that when a terminal is handed over between access network devices, routing of a data stream between a MEC network element and the terminal can be adjusted in time, thereby preventing data stream interrupt.

According to one aspect, an embodiment of the present invention provides a communication method in a handover process, and the method includes: when a terminal is handed over from a source access network device to a target access network device, obtaining, by a gateway device, address information of the target access network device; obtaining, by the gateway device, address information of a Mobile Edge Computing MEC network element; and sending, by the gateway device, the address information of the target access network device to the MEC network element based on the address information of the MEC network element, so that the MEC network element modifies stored address information of the source access network device to the address information of the target access network device.

In a possible design, the address information of the target access network device may be carried in a message sent by the gateway device to the MEC network element. Optionally, the gateway device may further send identification information of the terminal to the MEC network element.

For example, the gateway device sends a session modification request message to the MEC network element, and the session modification request message includes the address information of the target access network device and the identification information of the terminal. The session modification request message may be used to request the MEC network element to modify the stored address information of the source access network device to the address information of the target access network device.

When the terminal is handed over from the source access network device to the target access network device, the gateway device sends the address information of the target access network device to the MEC network element, so that the MEC network element modifies the stored address information of the source access network device to the address information of the target access network device. In this way, routing of a data stream between the MEC network element and the terminal can be adjusted in time, thereby preventing data stream interrupt.

In a possible design, the gateway device is a target gateway device corresponding to the target access network device, and the method further includes: sending, by the target gateway device, address information of the target gateway device to the MEC network element, so that the MEC network element modifies stored address information of a source gateway device corresponding to the source access network device to the address information of the target gateway device.

In a possible design, the obtaining, by the gateway device, address information of an MEC network element includes: receiving, by the gateway device, the address information of the MEC network element sent by a mobility management network element.

In a possible design, the method further includes: sending, by the gateway device, the address information of the MEC network element to a mobility management network element.

In this way, the mobility management network element can obtain the address information of the MEC network element, and may send the address information of the MEC network element to the target access network device, so as to establish a data transmission channel between the target access network device and the MEC network element.

In a possible design, the obtaining, by a gateway device, address information of the target access network device includes: receiving, by the gateway device, the address information of the target access network device sent by a mobility management network element.

According to another aspect, an embodiment of the present invention provides a communication method in a handover process, and the method includes: when a terminal is handed over from a source access network device to a target access network device, receiving, by a Mobile Edge Computing MEC network element, address information of the target access network device sent by a gateway device; and modifying, by the MEC network element, stored address information of the source access network device to the address information of the target access network device.

In a possible design, the address information of the target access network device may be carried in a message sent by the gateway device. For example, the MEC network element receives a session modification request message sent by the gateway device, and the session modification request message includes the address information of the target access network device. The session modification request message may be used to request the MEC network element to modify the stored address information of the source access network device to the address information of the target access network device.

In a possible design, the MEC network element may further receive identification information of the terminal sent by the gateway device.

When the terminal is handed over from the source access network device to the target access network device, the MEC network element receives the address information of the target access network device sent by the gateway device, and modifies the stored address information of the source access network device to the address information of the target access network device, so that routing of a data stream between the MEC network element and the terminal can be adjusted in time, thereby preventing data stream interrupt.

In a possible design, the gateway device is a target gateway device corresponding to the target access network device, and the method further includes: receiving, by the MEC network element, address information of the target gateway device sent by the target gateway device; and modifying, by the MEC network element, stored address information of a source gateway device corresponding to the source access network device to the address information of the target gateway device.

In a possible design, the address information of the target gateway device may be carried in a message sent by the target gateway device to the MEC network element. For example, the MEC network element receives a session modification request message sent by the target gateway device, and the session modification request message includes the address information of the target gateway device. The session modification request message may be used to request the MEC network element to modify the stored address information of the source gateway device to the address information of the target gateway device.

According to still another aspect, an embodiment of the present invention provides a gateway device, and the gateway device has a function of implementing behavior of the gateway device in the foregoing method designs. The function may be implemented by hardware, or may be implemented by hardware by executing corresponding software. The hardware or the software includes one or more modules corresponding to the foregoing function.

In a possible design, the gateway device includes a processing unit and a communications unit. The processing unit is configured to support the gateway device in performing a corresponding function in the foregoing methods. The communications unit is configured to support communication between the gateway device and another device. The gateway device may further include a storage unit. The storage unit is coupled to the processing unit, and the storage unit stores a program instruction and data that are necessary for the gateway device. In an example, the processing unit may be a processor, the communications unit may be a communications interface, and the storage unit may be a memory.

According to still another aspect, an embodiment of the present invention provides an MEC network element, and the MEC network element has a function of implementing behavior of the MEC network element in the foregoing method designs. The function may be implemented by hardware, or may be implemented by hardware by executing corresponding software. The hardware or the software includes one or more modules corresponding to the foregoing function.

In a possible design, the MEC network element includes a processing unit and a communications unit. The processing unit is configured to support the MEC network element in performing a corresponding function in the foregoing methods. The communications unit is configured to support communication between the MEC network element and another device. The MEC network element may further include a storage unit. The storage unit is coupled to the processing unit, and the storage unit stores a program instruction and data that are necessary for the MEC network element. In an example, the processing unit may be a processor, the communications unit may be a communications interface, and the storage unit may be a memory.

According to yet another aspect, an embodiment of the present invention provides a computer readable storage medium, configured to store a computer software instruction used by the foregoing gateway device, and the computer readable storage medium includes a program designed for performing the foregoing aspects.

According to yet another aspect, an embodiment of the present invention provides a computer readable storage medium, configured to store a computer software instruction used by the foregoing MEC network element, and the computer readable storage medium includes a program designed for performing the foregoing aspects.

In the embodiments of the present invention, when the terminal is handed over from the source access network device to the target access network device, the gateway device sends the address information of the target access network device to the MEC network element, so that the MEC network element modifies the stored address information of the source access network device to the address information of the target access network device. In this way, routing of a data stream between the MEC network element and the terminal can be adjusted in time, thereby preventing data stream interrupt.

DESCRIPTION OF EMBODIMENTS

Figure 1:
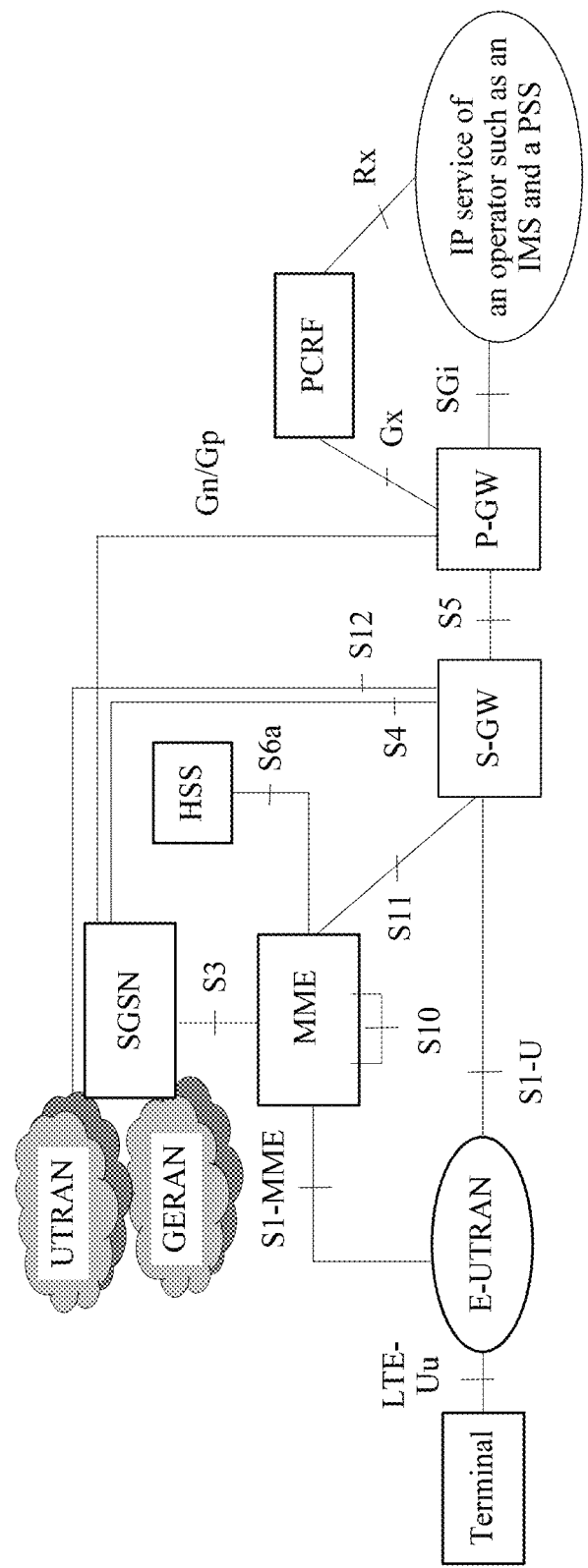
FIG. 1 is a schematic diagram of a possible system architecture according to an embodiment of the present invention.

To make the objectives, technical solutions, and advantages of the embodiments of the present invention clearer, the following describes the technical solutions of the embodiments of the present invention with reference to the accompanying drawings in the embodiments of the present invention.

Network architectures and business scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new business scenario emerges, the technical solutions provided in the embodiments of the present invention are further applicable to a similar technical problem.

In the embodiments of the present invention, nouns "network" and "system" are often interchangeably used, but meanings of the nouns can be understood by a person skilled in the art. The terminal in the embodiments of the present invention may include various handheld devices having a wireless communication function, vehicle-mounted devices, wearable devices, computing devices, or other processing devices connected to a wireless modem, and various forms of user equipment (UE), mobile stations (MS), terminal devices, and the like. For ease of description, the devices mentioned above are collectively referred to as terminals. An access network device in the embodiments of the present invention may be a base station (BS). The base station is an apparatus that is deployed in a radio access network and that is configured to provide a wireless communication function for the terminal. The base station may include a macro base station, a micro base station, a relay station, an access point, and the like in various forms. In systems using different radio access technologies, names of devices having a base station function may be different, for example, the device is referred to as an evolved NodeB (eNB or eNodeB) in a Long Term Evolution (LTE) system, or referred to as a NodeB in a 3G communications system. For ease of description, in the embodiments of the present invention, the foregoing apparatuses that provide the wireless communication function for the terminal are collectively referred to as a base station or a BS.

A mobility management network element may be a mobility management entity (MME for short) or a general packet radio system (GPRS for short) serving support node (SGSN for short). This is not limited in the present invention.

However, for ease of description, the following uses the eNB and the MME as an example to describe the solutions of the embodiments of the present invention. It should be understood that, although the following uses the eNB as an example to describe the access network device, and the MME as an example to describe the mobility management network element, the embodiments of the present invention are not limited to a standard represented by these terms. The embodiments of the present invention may also be applied to another standard, and all these changes fall within the scope of the embodiments of the present invention.

The embodiments of the present invention may be applied to a system architecture shown in FIG. 1. The following first describes main network entities in the system architecture.

An evolved universal terrestrial radio access network (E-UTRAN for short) is a network that includes a plurality of eNBs, and implements a radio physical layer function, resource scheduling and radio resource management, radio access control, and a mobility management function. The eNB is connected to an S-GW by using an S1-U interface, and is configured to transmit user data; and is connected to an MME by using an S1 control plane interface (S1-MME interface), and uses an S1 Application Protocol (S1-AP for short) to implement a function such as radio access bearer control.

The MME is mainly responsible for all control plane functions of user and session management, including non-access stratum (NAS for short) signaling and security, tracking area list (TAL for short) management, P-GW and S-GW selection, and the like.

The S-GW is mainly responsible for data transmission and forwarding, routing handover, and the like of a terminal, and serves as a local mobility anchor when user equipment is handed over between the eNBs.

The packet data network gateway (PDN GW or PGW for short) is ingress for an external network to send data to the terminal, and is responsible for assignment of an Internet Protocol (IP for short) address of the terminal, data packet filtering of the terminal, rate control, charging information generation, and the like.

After the terminal accesses an evolved packet system (EPS for short), the P-GW assigns an IP address for the terminal. The terminal connects to the external network by using the IP address to transmit data. All uplink data packets of the terminal are sent to the external network by using the P-GW, and all downlink data packets of the external network are sent to the terminal by using the P-GW.

A data packet sent or received by the terminal is transmitted in an EPS network by using an EPS bearer. Each terminal may have a plurality of bearers, and different bearers may meet Quality of Service (QoS for short) requirements of different services. The eNB and the S-GW store information about each bearer, namely, a bearer context. The information includes information about an S-GW tunnel endpoint identifier (TEID for short) and information about an eNB TEID. The S-GW TEID is used for an uplink data packet sent by the eNB to the S-GW, and the eNB TEID is used for a downlink data packet sent by the S-GW to the eNB. The eNB implements bearer context synchronization with the MME by using an S1-AP message, and the S-GW implements bearer context synchronization with the MME by using a GPRS Tunneling Protocol-Control Plane (GTP-C for short) message, so as to further implement bearer context synchronization between the eNB and the S-GW.

When receiving an uplink data packet of the terminal, the eNB encapsulates the uplink data packet of the terminal into an uplink GPRS Tunneling Protocol-User Plane (GTP-U for short) packet based on a context of a bearer. The uplink GTP-U packet includes a GTP-U header, and the GTP-U header includes S-GW TEID information of the bearer. Different bearers use different S-GW TEIDs. Therefore, when receiving the uplink GTP-U packet sent by the eNB, the S-GW may determine, based on the GTP-U header, a bearer to which the packet belongs; and when receiving a downlink data packet sent to the terminal, the S-GW encapsulates the downlink data packet into a downlink GTP-U packet. The downlink GTP-U packet includes the GTP-U header, and the GTP-U header includes eNB TEID information of the bearer.

Logically, an MEC network element mainly includes a data bus and an application. The data bus is responsible for obtaining a data packet of the terminal and forwarding the data packet to a corresponding application. After processing the data packet, the application returns the packet to the data bus for routing. A plurality of applications can be installed on the MEC network element to enhance user service experience. The application on the MEC network element may intercept data sent by the terminal for modification, detection, forwarding, or the like, or may directly respond to data sent by the terminal. For example, a video cache application may be installed on the MEC network element. When the terminal requests a video service, the request of the terminal is processed by the video cache application. If the video cache application does not have a video requested by the terminal, the video cache application further forwards the user request to the S-GW. If the video cache application stores a video requested by the terminal, the video cache application directly sends a video data packet to the terminal. Therefore, deploying the MEC network element near an access network can effectively improve user service experience for the terminal.

Figure 2:
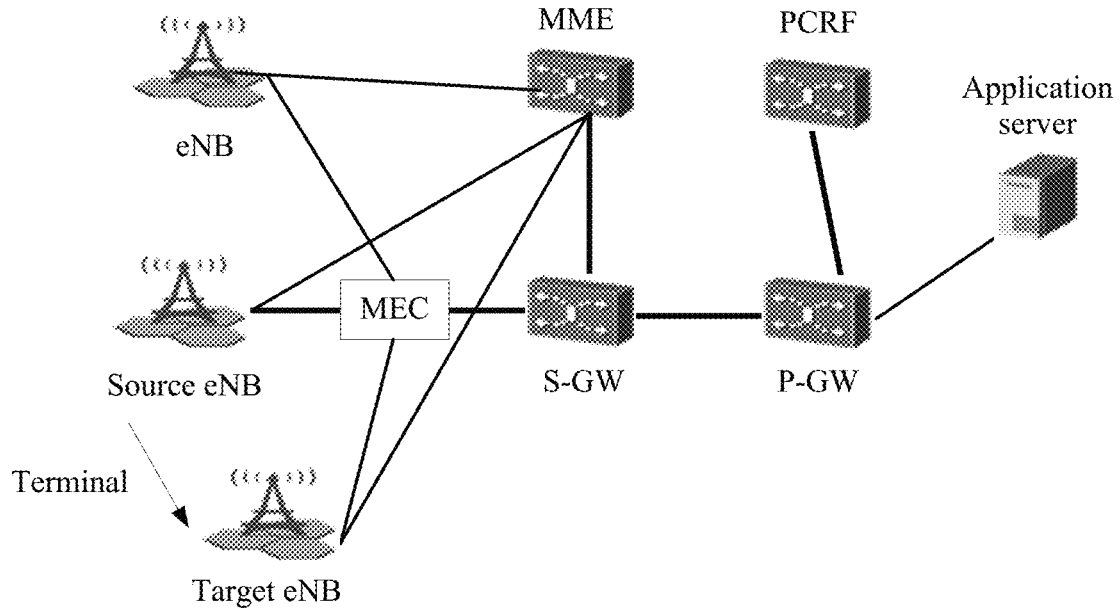
FIG. 2 is a schematic diagram of a possible application scenario according to an embodiment of the present invention.

FIG. 2 is a schematic diagram of an application scenario according to an embodiment of the present invention. As shown in FIG. 2, an MEC network element is connected in series to an S1-U interface between an eNB and an S-GW device. The MEC network element may establish a connection to the S-GW. For example, the MEC network element establishes a connection to the S-GW by using a preset interface, and is connected to the eNB by using the S1-U interface.

The MEC network element and the S-GW may obtain address information of each other, and establish a data transmission channel between the MEC network element and the S-GW. After obtaining the address information of the MEC network element, the S-GW may use the address information of the MEC network element as the address information of the S-GW and notify, by using an MME, the eNB of the address information of the MEC network element. In other words, in the prior art, the S-GW notifies the eNB of the address information of the S-GW, but in the application scenario of this embodiment of the present invention, the S-GW uses the address information of the MEC network element as the address information of the S-GW, and the S-GW notifies the eNB of the address information of the MEC network element by using the MME. In this case, from the perspective of the eNB, the eNB uses the MEC network element as the S-GW.

Figure 3:
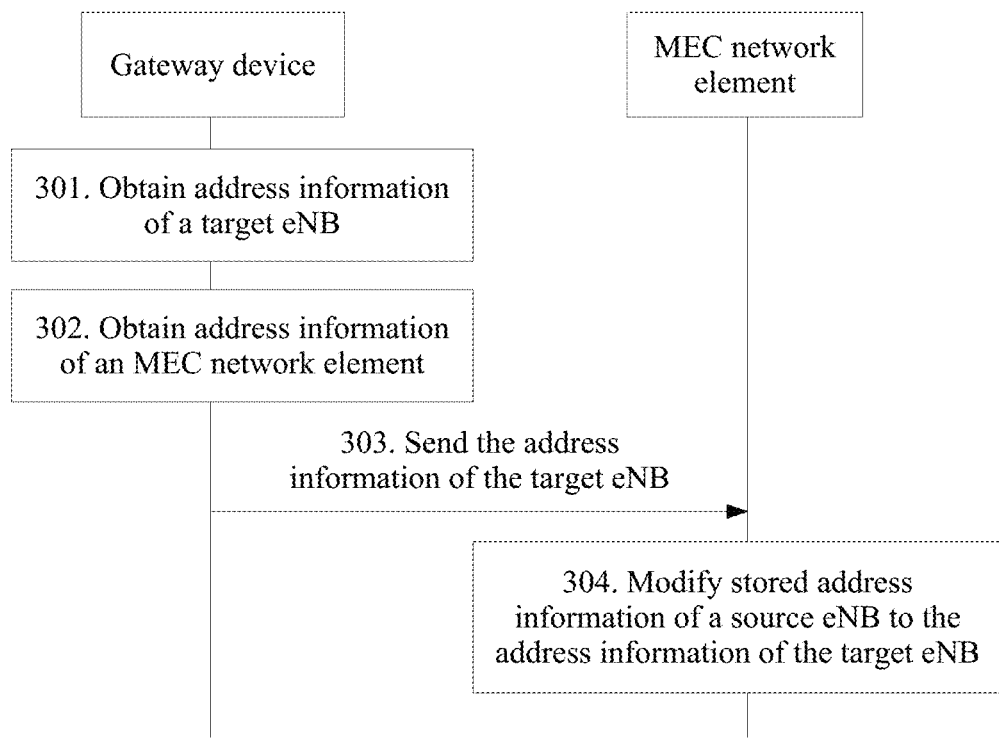
FIG. 3 is a schematic communication diagram of a communication method in a handover process according to an embodiment of the present invention.

FIG. 3 is a schematic flowchart of a communication method 300 in a handover process according to an embodiment of the present invention. As shown in FIG. 3, the communication method 300 includes the following content.

301. When a terminal is handed over from a source eNB to a target eNB, a gateway device obtains address information of the target eNB.

In an example, the gateway device may receive the address information of the target eNB sent by an MME.

302. The gateway device obtains address information of an MEC network element.

In an example, the address information of the MEC network element may be pre-configured in the gateway device, and the gateway device may obtain the pre-configured address information of the MEC network element; or the gateway device may obtain the address information of the MEC network element from a message sent by the MME.

In another example, the gateway device may further obtain the address information of the MEC network element based on a correspondence. The correspondence may be a correspondence between the address information of the MEC network element and either or both of identification information of the terminal and identification information of the target eNB. For example, an MEC network element query system stores the correspondence, and the address information of the MEC network element may be obtained by querying the MEC network element query system based on at least one piece of the identification information of the terminal, identification information of the gateway device, and address information of a gateway.

In still another example, if a current gateway device is a target gateway device after handover, a connection may be further established between a source gateway device and the target gateway device, and the source gateway device sends the address information of the MEC network element and the like to the target gateway device.

In still another example, an IP connection may be between the MEC network element and the gateway device, and the address information of the MEC network element includes an IP address of the MEC network element; or a GTP-based tunnel connection may be between the MEC network element and the gateway device, and the address information of the MEC network element includes an IP address of the MEC network element and a TEID.

It should be noted that an execution sequence of step 301 and step 302 is not limited.

303. The gateway device sends the address information of the target eNB to the MEC network element based on the address information of the MEC network element.

In an example, the gateway device may further send the identification information of the terminal to the MEC network element, and the identification information of the terminal is used to identify the terminal that is handed over. Content of the identification information of the terminal is not limited in this embodiment of the present invention, provided that the terminal can be identified. In this way, when receiving a downlink data packet of the terminal, the MEC network element can send the downlink data packet to the target eNB.

304. After the MEC network element receives the address information of the target eNB sent by the gateway device, the MEC network element modifies stored address information of the source eNB to the address information of the target eNB.

For example, the MEC network element deletes the address information of the source eNB stored at a specified location in a memory, and stores the address information of the target eNB at the specified location. Alternatively, the MEC network element replaces the address information of the source eNB stored at a specified location in a memory with the address information of the target eNB.

After the MEC network element modifies context information of the terminal, a user plane data transmission channel between the MEC network element and the target eNB may be established.

In an example, the MEC network element may further receive the downlink data packet of the terminal, and send the downlink data packet to the target eNB based on the address information of the target eNB.

In this embodiment of the present invention, when the terminal is handed over from a source access network device to a target access network device, the gateway device sends address information of the target access network device to the MEC network element, so that the MEC network element modifies stored address information of the source access network device to the address information of the target access network device. In this way, routing of a data stream between the MEC network element and the terminal can be adjusted in time, thereby preventing data stream interrupt.

In the method shown in FIG. 3, if the gateway device also changes, when the gateway device is the target gateway device corresponding to the target access network device, the communication method 300 may further include: receiving, by the MEC network element, address information of the target gateway device sent by the target gateway device; and modifying, by the MEC network element, stored address information of a gateway device corresponding to the source access network device to the address information of the target gateway device. In this way, when the gateway device also changes in the handover process, a connection between the MEC network element and the gateway device can be established in time, so as to prevent data stream interrupt.

The gateway device in this embodiment of the present invention may be an S-GW, or may be a gateway device that has both an S-GW function and a P-GW function.

There may be an X2 interface between the source eNB and the target eNB, or there may be no X2 interface between the source eNB and the target eNB. When there is an X2 interface between the source eNB and the target eNB, a handover preparation process may be performed by using the X2 interface, and the source eNB may directly request the target eNB to perform resource reservation. In this way, the MME is not used in the handover process, and interaction between a wireless side and the MME is reduced. For details, refer to solutions shown in FIG. 4 and FIG. 5.

When there is no X2 interface between the source eNB and the target eNB, handover in an LTE system needs to be performed through an S1 interface. Because the source eNB and the target eNB cannot communicate directly, the MME is used as a signaling relay between the two eNBs, and a signaling handover process is more complex than the handover based on the X2 interface. For details, refer to solutions shown in FIG. 6, and FIG. 7A and FIG. 7B.

The following describes in detail an application of the communication method according to the embodiments of the present invention in the system architecture shown in FIG. 2 with reference to FIG. 4 to FIG. 7A and FIG. 7B.

Figure 4:
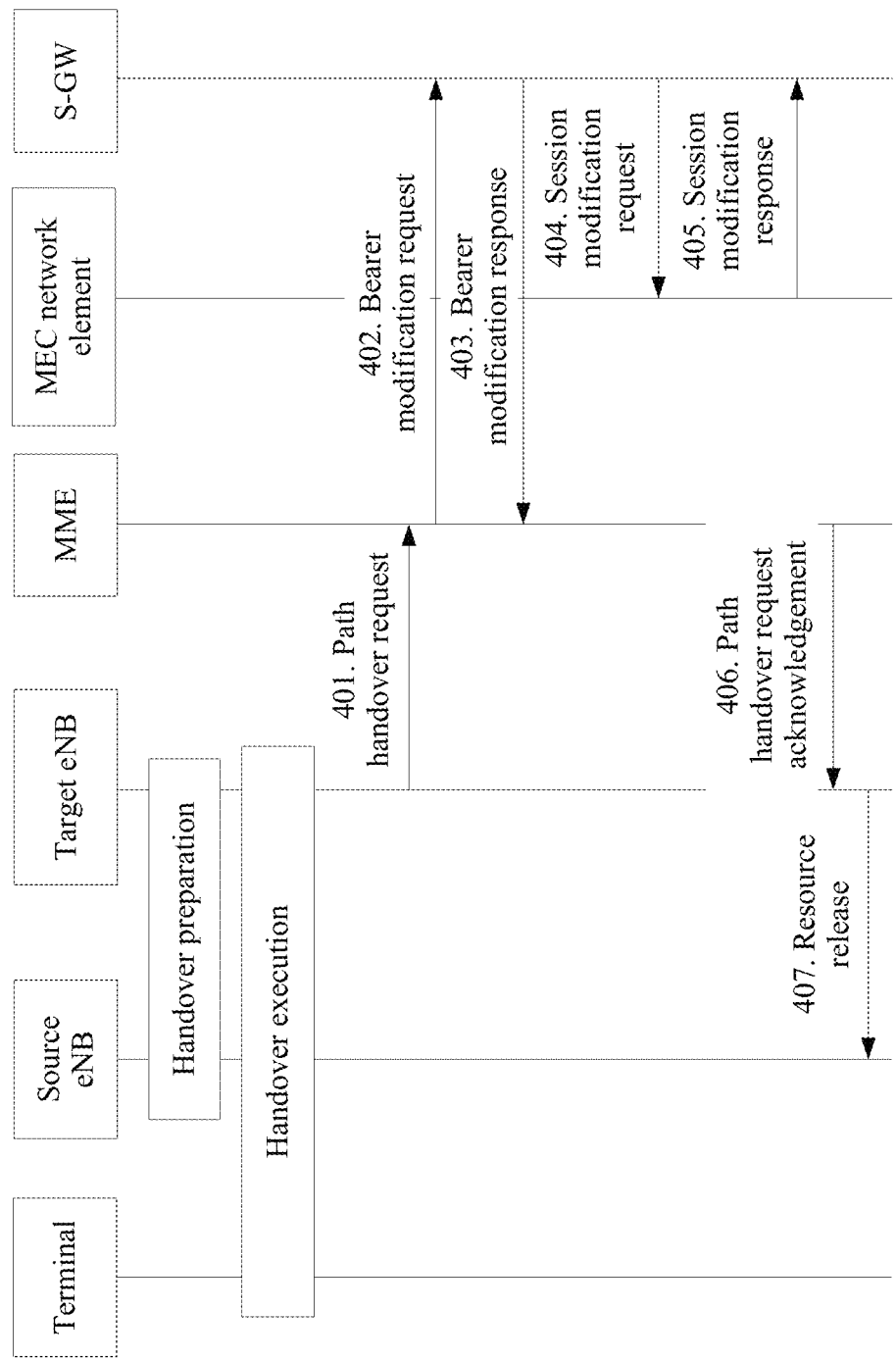
FIG. 4 is a schematic communication diagram of another communication method in a handover process according to an embodiment of the present invention.

FIG. 4 is a schematic communication diagram of another communication method 400 in a handover process according to an embodiment of the present invention. The communication method 400 may be applied to a system architecture in which there is an X2 interface between a source eNB and a target eNB, and an S-GW does not change in a cell handover process, in other words, the source eNB and the target eNB are corresponding to a same S-GW.

When a terminal is handed over from the source eNB to the target eNB, the source eNB may directly request the target eNB to perform resource reservation when a handover preparation process may be performed between the source eNB and the target eNB by using the X2 interface. For the handover preparation process between the source eNB and the target eNB, and a handover execution process of the terminal, the source eNB, and the target eNB, refer to the prior art. When the terminal is handed over to the target eNB, the following content is executed.

401. The target eNB sends a path handover request message to an MME, where the path handover request message includes address information of the target eNB.

402. The MME sends a bearer modification request message to the S-GW, where the bearer modification request message includes the address information of the target eNB.

403. The S-GW sends a bearer modification response message to the MME, where the bearer modification response message includes address information of an MEC network element. In implementation, the address information of the MEC network element herein is sent by the S-GW to the MME as address information of the S-GW. In other words, the address information of the S-GW included in the bearer modification response message sent by the S-GW to the MME is actually the address information of the MEC network element.

404. The S-GW sends a session modification request message to the MEC network element, where the session modification request message includes the address information of the target eNB.

It should be noted that a message name herein is not limited. The S-GW notifies the MEC network element of the address information of the target eNB.

405. After receiving the session modification request message, the MEC network element modifies stored address information of the source eNB to the address information of the target eNB, and sends the bearer modification response message to the S-GW.

In this case, a user plane downlink data transmission channel between the MEC network element and the target eNB may be established, so that the MEC network element can send a downlink data stream of the terminal to the target eNB.

406. The MME sends a path handover request acknowledgement message to the target eNB, where the path handover request acknowledgement message includes the address information of the MEC network element, so that the target eNB can establish a data transmission channel between the target eNB and the MEC network element.

In the prior art, the path handover request acknowledgement message sent by the MME to the target eNB includes the address information of the S-GW. In this embodiment of the present invention, the address information of the S-GW considered by the MME herein is actually the address information of the MEC network element. Therefore, a network is not affected from the perspective of the MME and the eNB.

407. The target eNB sends a resource release message to the source eNB.

The foregoing messages in the steps may further include identification information of the terminal, and the identification information of the terminal is used to identify the terminal that is handed over.

It should be understood that step 403 may be performed before steps 404 and 405, may be performed after steps 404 and 405, or may be performed simultaneously with steps 404 and 405. This is not limited in this embodiment of the present invention.

Figure 5:
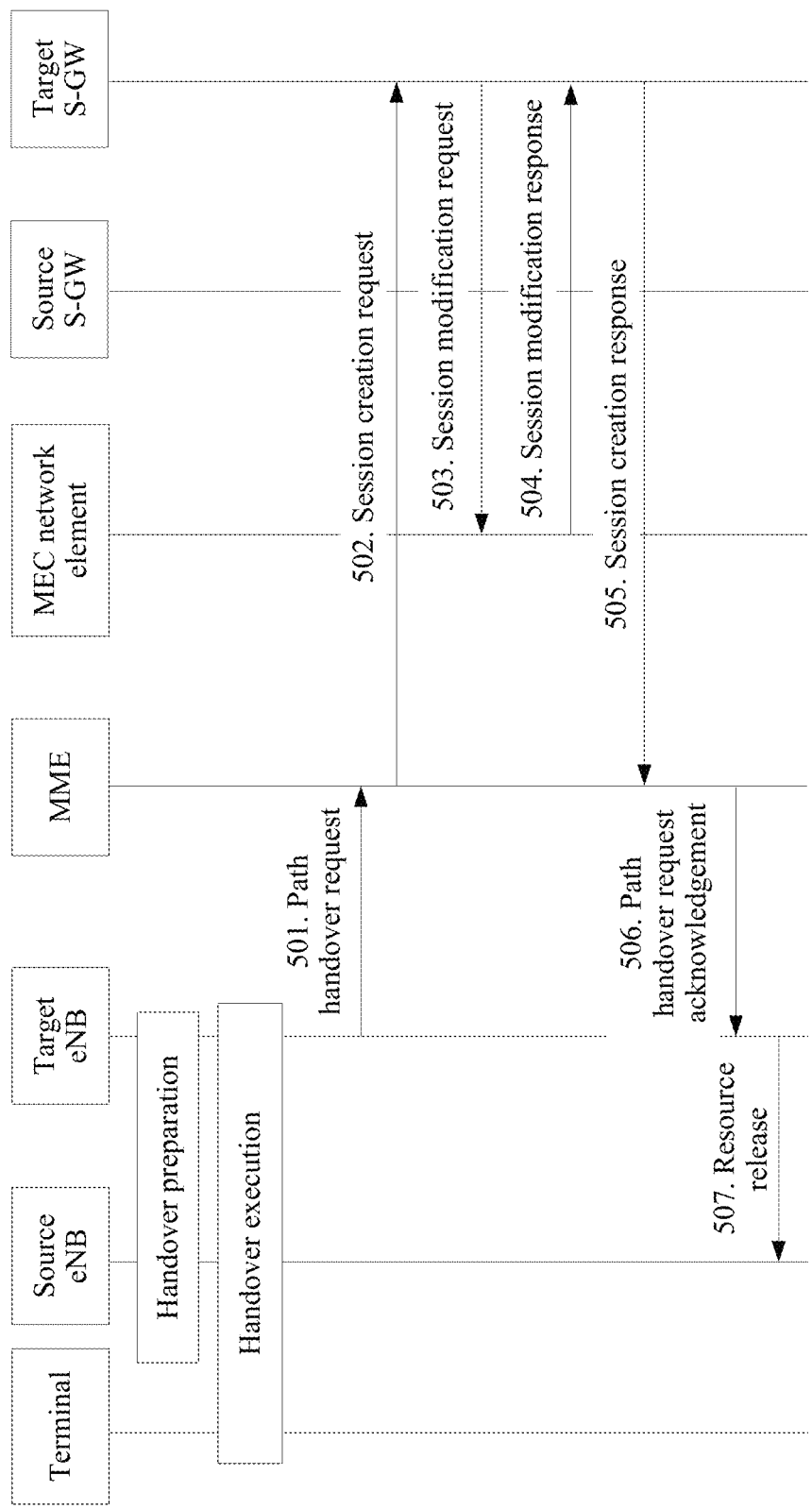
FIG. 5 is a schematic communication diagram of still another communication method in a handover process according to an embodiment of the present invention.

FIG. 5 is a schematic communication diagram of still another communication method 500 in a handover process according to an embodiment of the present invention. The communication method 500 may be applied to a system architecture in which there is an X2 interface between a source eNB and a target eNB, and an S-GW changes in a cell handover process, in other words, the source eNB and the target eNB are corresponding to different S-GWs.

For a handover preparation process between the source eNB and the target eNB, and a handover execution process of a terminal, the source eNB, and the target eNB, refer to the prior art. When the terminal is handed over to the target eNB, the following content is executed.

501. The target eNB sends a path handover request message to an MME.

502. The MME sends a session creation request message to a target S-GW, where the session creation request message includes address information of the target eNB.

Optionally, the session creation request message may further include address information of an MEC network element. When a connection is initially established, an address information of the MEC network element is sent to the MME as address information of an S-GW. Therefore, address information about an S-GW stored in the MME is actually the address information of the MEC network element. In this case, the address information of the MEC network element is sent to the target S-GW, so that the target S-GW can obtain the address information of the MEC network element.

503. The target S-GW obtains address information of an MEC network element, and the target S-GW sends a session modification request message to the MEC network element, where the session modification request message includes the address information of the target eNB and address information of the target S-GW.

It should be noted that a message name herein is not limited, and this part is used by the target S-GW to notify the MEC network element of the address information of the target eNB and the address information of the target S-GW.

The session modification request message may be used to request the MEC network element to modify stored address information of the source eNB to the address information of the target eNB, and request the MEC network element to establish a user plane data channel with the target S-GW.

Optionally, when the session creation request message in step 502 further includes the address information of the MEC network element, the target S-GW may obtain the address information of the MEC network element from the session creation request message.

Optionally, a connection between a source S-GW and the target S-GW is established, and the source S-GW sends the address information of the MEC network element and the like to the target S-GW. (This process is not shown in the figure above.)

The target S-GW may further obtain the address information of the MEC network element by using another method, and details are not described herein again.

504. After receiving the session creation request message, the MEC network element modifies stored address information of a source S-GW to the address information of the target S-GW, modifies the address information of the source eNB to the address information of the target eNB, and sends a session modification response message to the target S-GW, where the session modification response message includes the address information of the MEC network element.

It should be noted that a name of a message between the MEC network element and the S-GW is not limited, and a purpose of this part is that the MEC network element notifies the S-GW of the address information of the MEC network element.

505. The target S-GW sends a session creation response message to the MME, where the session creation response message includes the address information of the MEC network element.

In the prior art, the session creation message herein includes the address information of the target S-GW. In this embodiment of the present invention, the MEC network element is directly connected to the eNB. Therefore, the address information of the MEC network element is sent to the MME as the address information of the S-GW. From the perspective of the MME, the MME is perception-free, and considers the address information of the MEC network element as the address information of the S-GW.

506. The MME sends a path handover request acknowledgement message to the target eNB, where the path handover request acknowledgement message includes the address information of the MEC network element.

In the prior art, the path handover request acknowledgement message sent by the MME to the target eNB includes address information of an S-GW device. In step 506 of this embodiment of the present invention, the MME sends the received address information of the S-GW considered by the MME (actually the address information of the MEC network element) in step 505 to the eNB. The MME and the eNB are perception-free, and consider the address information of the MEC network element as the address information of the S-GW.

In this case, a user plane uplink data transmission channel between the target eNB and the MEC network element may be established, so that the target eNB can send an uplink data stream of the terminal to the MEC network element.

507. The target eNB sends a resource release message to the source eNB.

Figure 6:
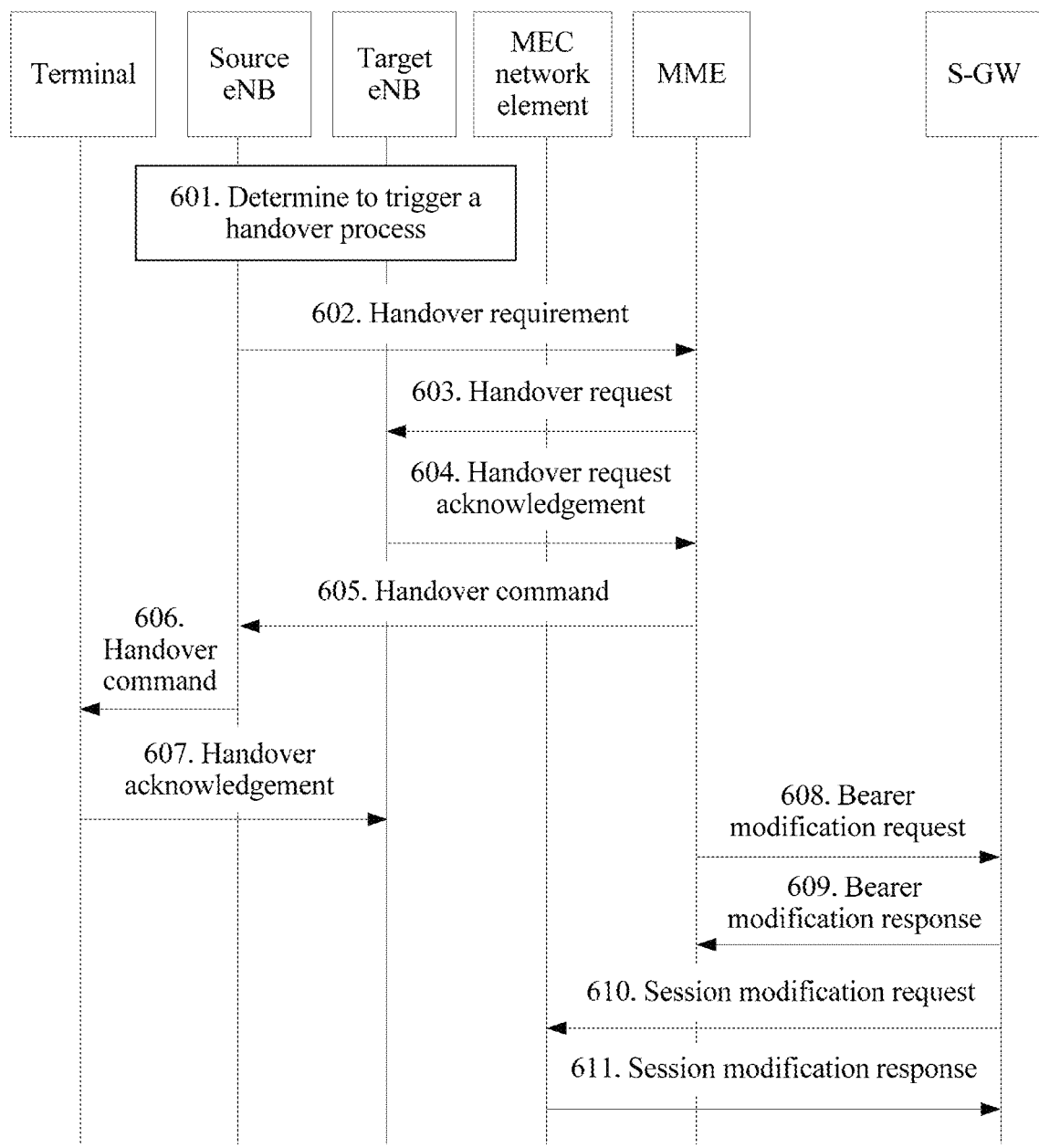
FIG. 6 is a schematic communication diagram of still another communication method in a handover process according to an embodiment of the present invention.

FIG. 6 is a schematic communication diagram of still another communication method 600 in a handover process according to an embodiment of the present invention. The communication method 600 may be applied to a system architecture in which there is no X2 interface between a source eNB and a target eNB, and an S-GW does not change in a cell handover process, in other words, the source eNB and the target eNB are corresponding to a same S-GW.

601. The source eNB determines to trigger a handover process.

602. The source eNB sends a handover requirement message to an MME.

603. The MME sends a handover request message to the target eNB.

604. The target eNB sends a handover request acknowledgement message to the MME.

605. The MME sends a handover command message to the source eNB.

606. The source eNB sends the handover command message to a terminal.

607. The terminal sends a handover acknowledgement message to the target eNB.

608. The MME sends a bearer modification request message to an S-GW.

609. The S-GW sends a bearer modification response message to the MME.

Step 601 to step 609 are the same as the prior art, and corresponding content is omitted properly.

It should be noted that, in the prior art, the handover request message in step 603 includes address information of the S-GW. However, in this embodiment of the present invention, when the terminal accesses a network, to connect an MEC network element to an S1 interface in series, the address information of the S-GW is actually address information of the MEC network element.

Therefore, after step 603 and step 604, a user plane uplink data transmission channel between the target eNB and the MEC network element may be established, so that the target eNB sends an uplink data stream of the terminal to the MEC network element.

610. The S-GW sends a session modification request message to an MEC network element, where the session modification request message includes address information of the target eNB.

611. After receiving the session modification request message, the MEC network element modifies stored address information of the source eNB to the address information of the target eNB, and sends a session modification response message to the S-GW.

In this case, a user plane downlink data transmission channel between the MEC network element and the target eNB may be established, so that the MEC network element can send a downlink data stream of the terminal to the target eNB.

Figure 7A:
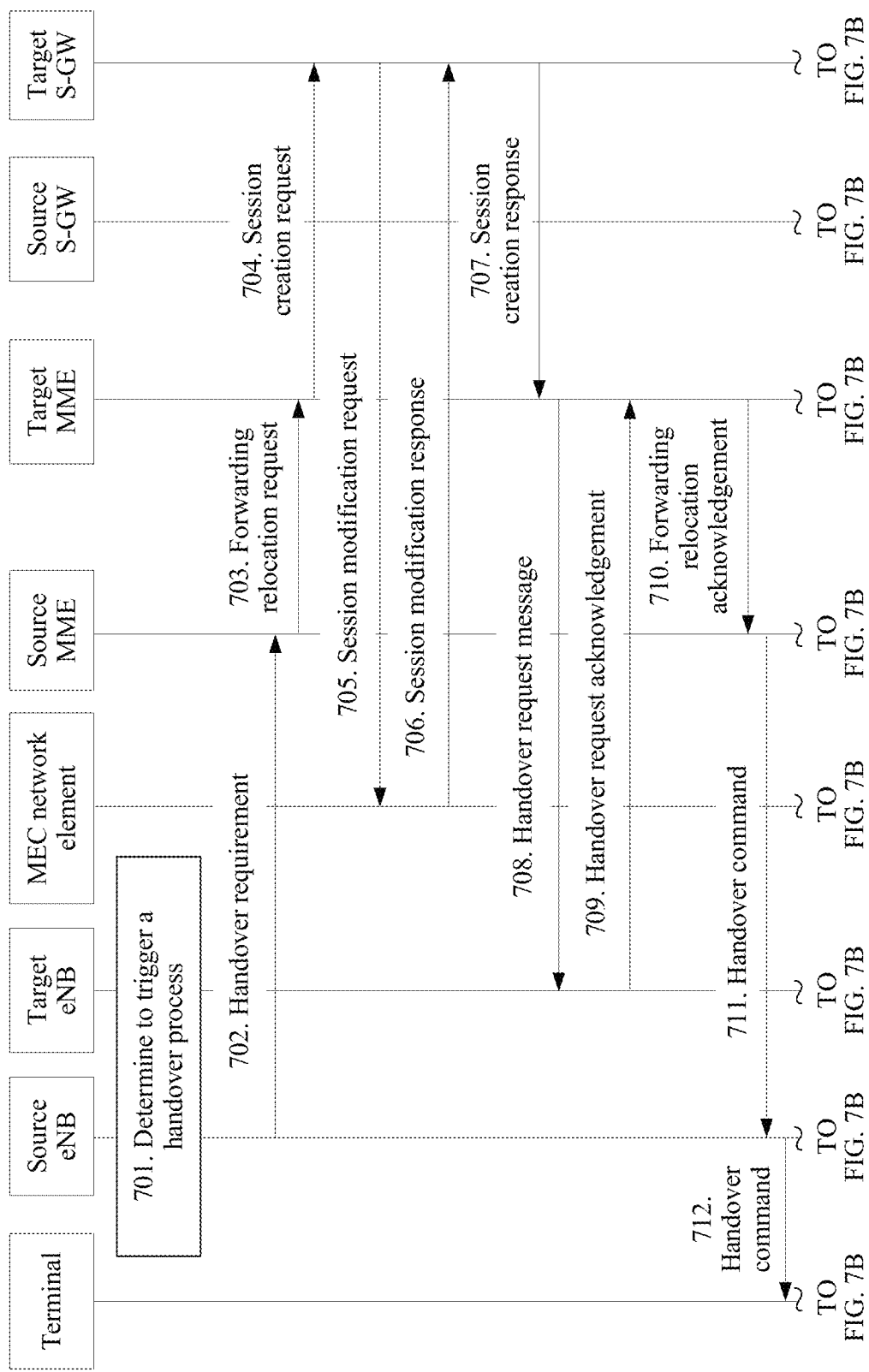
FIG. 7A and FIG. 7B are a schematic communication diagram of still another communication method in a handover process according to an embodiment of the present invention.
Figure 7B:
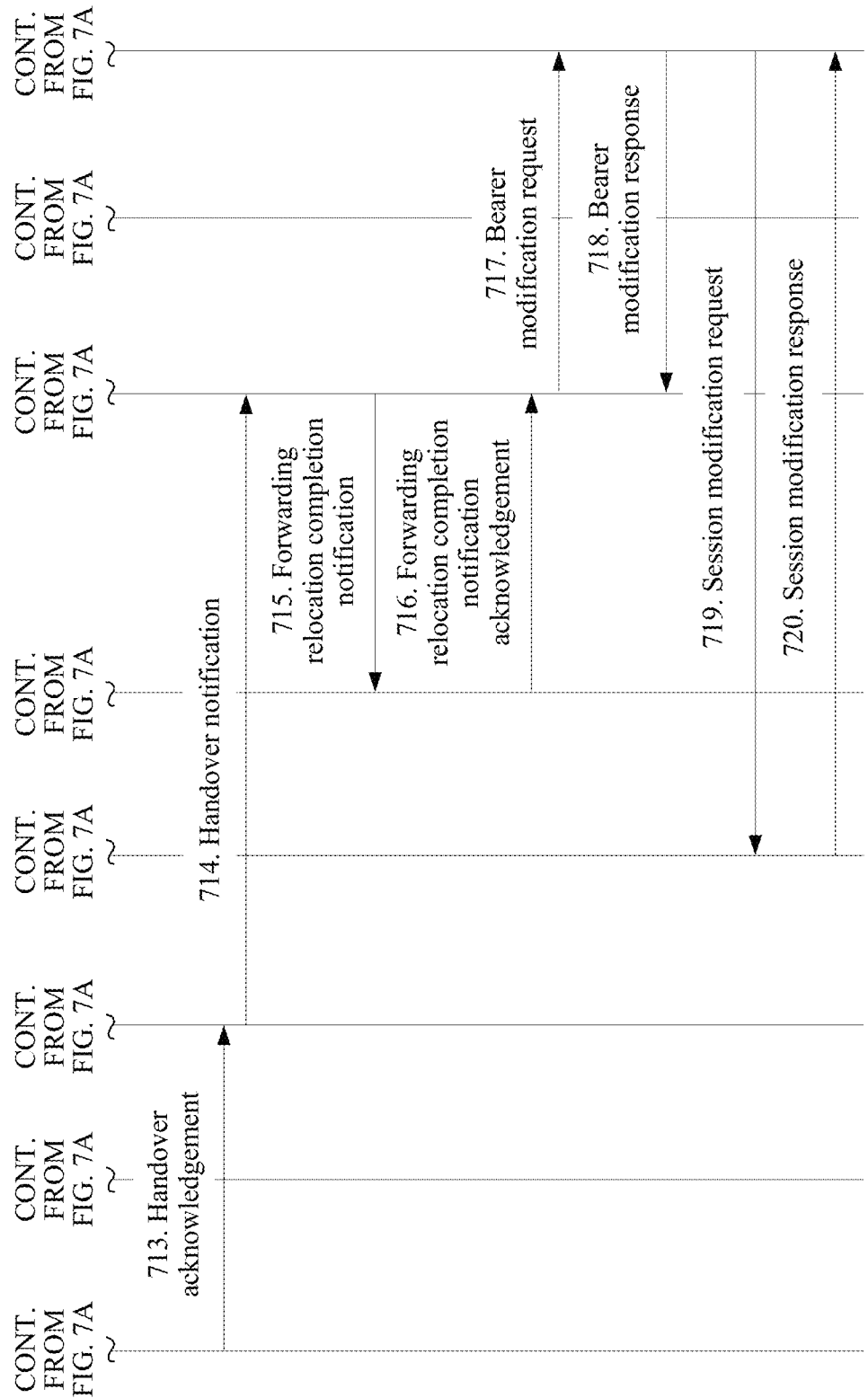

FIG. 7A and FIG. 7B are a schematic communication diagram of still another communication method 700 in a handover process according to an embodiment of the present invention. The communication method 700 may be applied to a system architecture in which there is no X2 interface between a source eNB and a target eNB, and both an MME and an S-GW change in a cell handover process.

701. The source eNB determines to initiate a handover process.

702. The source eNB sends a handover requirement message to a source MME.

703. The source MME sends a forwarding relocation request message to a target MME.

704. The target MME sends a session creation request message to a target S-GW.

Step 701 to step 704 are the same as the prior art, and corresponding content is omitted herein properly.

Optionally, the session creation request message in step 704 may further include address information of an MEC network element.

705. The target S-GW sends a session modification request message to an MEC network element based on address information of the MEC network element, where the session modification request message includes address information of the target S-GW.

For a method for obtaining the address information of the MEC network element by the target S-GW, refer to the foregoing description, and details are not described herein again. It should be noted that a message name is not limited.

706. After receiving the session modification request message, the MEC network element modifies stored address information of a source S-GW to the address information of the target S-GW, and sends a session modification response message to the target S-GW.

In this case, a user plane data transmission channel between the MEC network element and the target S-GW may be established.

707. The S-GW sends a session creation response message to the target MME, where the session creation response message includes the address information of the target S-GW, an IP address of the S-GW and a TEID.

708. The target MME sends a handover request message to the target eNB, where the handover request message includes the address information of the MEC network element, that is, address information stored in the MME, and for the MME, the MME considers the address information of the MEC network element as the address information of the S-GW.

709. The target eNB sends a handover request acknowledgement message to the target MME.

In this case, a user plane uplink data transmission channel between the target eNB and the MEC network element may be established, so that the eNB can send an uplink data stream of the terminal to the MEC network element.

Step 710 to step 718 are the same as the prior art, and details are not described herein.

719. The target S-GW sends a session modification request message to the MEC network element, where the session modification request message includes address information of the target eNB.

720. After receiving the session modification request message, the MEC network element modifies stored address information of the source eNB to the address information of the target eNB, and sends a session modification response message to the target S-GW.

In this case, a user plane downlink data transmission channel between the MEC network element and the target eNB may be established, so that the MEC network element can send a downlink data stream of the terminal to the target eNB.

It should be understood that steps 705 and 706 may be simultaneously performed with steps 719 and 720, in other words, after step 718, so that the MEC network element simultaneously establishes data channels with the S-GW and the target eNB.

It should be noted that messages in the steps of the methods shown in FIG. 4 to FIG. 7A and FIG. 7B may further include identification information of the terminal, and the identification information of the terminal is used to identify the terminal that is handed over.

In the foregoing, the communication method in a handover process in the embodiments of the present invention is described in detail with reference to FIG. 3 to FIG. 7A and FIG. 7B. The following describes in detail an apparatus in the embodiments of the present invention with reference to FIG. 8 and FIG. 11.

The foregoing mainly describes the solutions in the embodiments of the present invention from the perspective of interaction between network elements. It may be understood that, to implement the foregoing functions, the network elements, such as the gateway device and the MEC network element, include a corresponding hardware structure and/or software module for performing each of the functions. A person of ordinary skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In this embodiment of the present invention, functional units of the gateway device and the MEC network element may be divided based on the foregoing method example. For example, each functional unit may be divided according to each function, or two or more functions may be integrated into one processing unit. The integrated unit may be implemented in a form of hardware, or may be implemented in a form of a software functional unit. It should be noted that the unit division in the embodiments of the present invention is an example, and is merely logical function division. There may be another division manner in an actual implementation.

Figure 8:
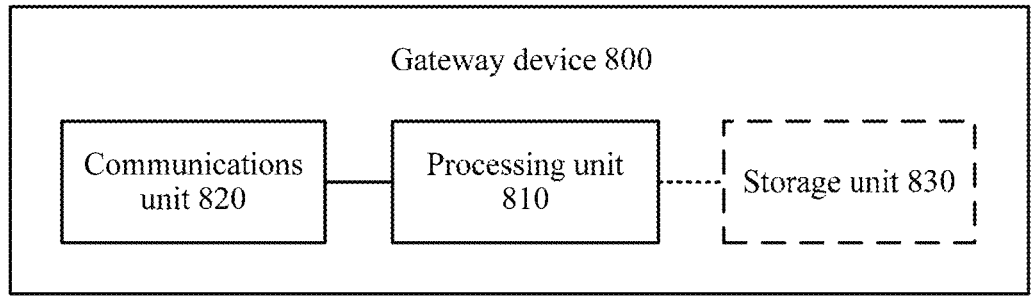
FIG. 8 is a schematic block diagram of a gateway device according to an embodiment of the present invention.

When an integrated unit is used, FIG. 8 is a possible schematic structural diagram of a gateway device in the foregoing embodiments. A gateway device 800 includes a processing unit 810 and a communications unit 820. The processing unit 810 is configured to control and manage an action of the gateway device. For example, the processing unit 810 is configured to support the gateway device in performing the process 301, the process 302, and the process 303 in FIG. 3, the process 404 in FIG. 4, the process 503 in FIG. 5, the process 610 in FIG. 6, the process 705 and the process 719 in FIG. 7A and FIG. 7B and/or another process of a technology described in this specification. The communications unit 820 is configured to support communication between the gateway device and another network entity, for example, communication with the MME, the eNB, and the MEC network element shown in FIG. 2. The gateway device

800 may further include a storage unit 830, configured to store program code and data of the gateway device.

The processing unit 810 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing unit 810 may implement or execute various examples of logical blocks, modules, and circuits that are described with reference to the contents disclosed in the present invention. The processor may also be a combination of computing functions, for example, a combination of one or more microprocessors or a combination of a DSP and a microprocessor. The communications unit 820 may be a communications interface, a transceiver, a transceiver circuit, or the like. The communications interface is a general term, and may include one or more interfaces. The storage unit 830 may be a memory.

Figure 9:
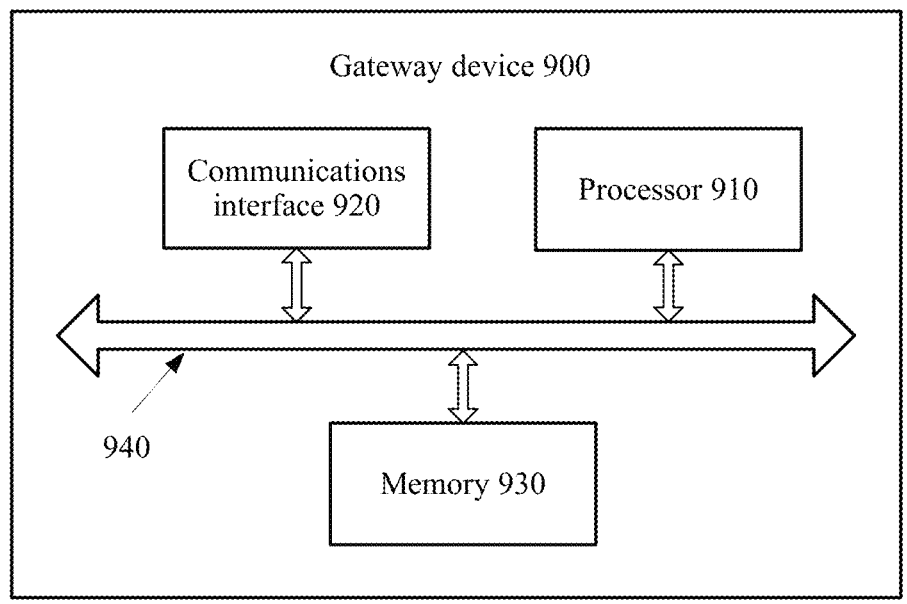
FIG. 9 is a schematic block diagram of another gateway device according to an embodiment of the present invention.

When the processing unit 810 is a processor, the communications unit 820 is a communications interface, and the storage unit 830 is a memory, the gateway device in this embodiment of the present invention may be a gateway device shown in FIG. 9.

As shown in FIG. 9, the gateway device 900 includes a processor 910, a communications interface 920, and a memory 930. Optionally, the gateway device 900 may further include a bus 940. The communications interface 920, the processor 910, and the memory 930 may be connected to each other by using the bus 940. The bus 940 may be a peripheral component interconnect (PCI for short) bus, an extended industry standard architecture (EISA for short) bus, or the like. The bus 940 may be categorized as an address bus, a data bus, a control bus, or the like. For ease of indication, the bus is indicated by using only one line in FIG. 9. However, it does not indicate that there is only one bus or only one type of bus.

Figure 10:
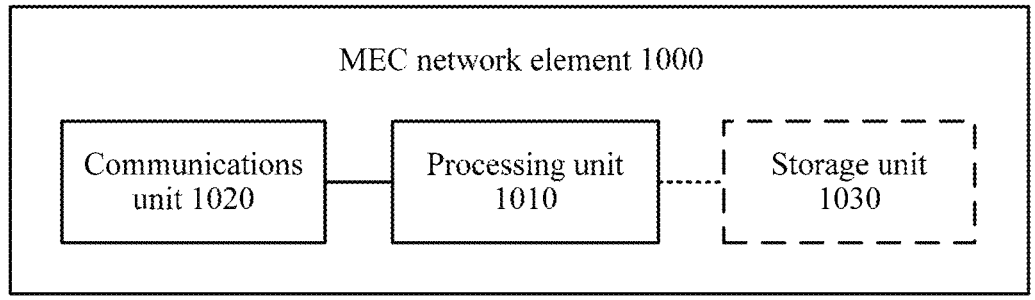
FIG. 10 is a schematic block diagram of an MEC network element according to an embodiment of the present invention.

FIG. 10 is a possible schematic structural diagram of an MEC network element in the foregoing embodiments. The MEC network element 1000 includes a processing unit 1010 and a communications unit 1020. The processing unit 1010 is configured to control and manage an action of the MEC network element. For example, the processing unit 1010 is configured to support the MEC network element in performing the process 304 in FIG. 3, the process 405 in FIG. 4, the process 504 in FIG. 5, the process 611 in FIG. 6, the process 706 and the process 720 in FIG. 7A and FIG. 7B and/or another process of a technology described in this specification. The communications unit 1020 is configured to support communication between the MEC network element and another network entity, for example, communication with the eNB, the S-GW, and the like shown in FIG. 2. The MEC network element 1000 may further include a storage unit 1030, configured to store program code and data of the MEC network element.

The processing unit 1010 may be a processor or a controller, for example, may be a CPU, a general purpose processor, a DSP, an ASIC, an FPGA or another programmable logic device, a transistor logic device, a hardware component, or any combination thereof. The processing unit 1010 may implement or execute various examples of logical blocks, modules, and circuits that are described with reference to the contents disclosed in the present invention. The processor may also be a combination of computing functions, for example, a combination of one or more microprocessors or a combination of a DSP and a microprocessor.

The communications unit 1020 may be a communications interface, a transceiver, a transceiver circuit, or the like. The communications interface is a general term, and may include one or more interfaces. The storage unit 1030 may be a memory.

Figure 11:
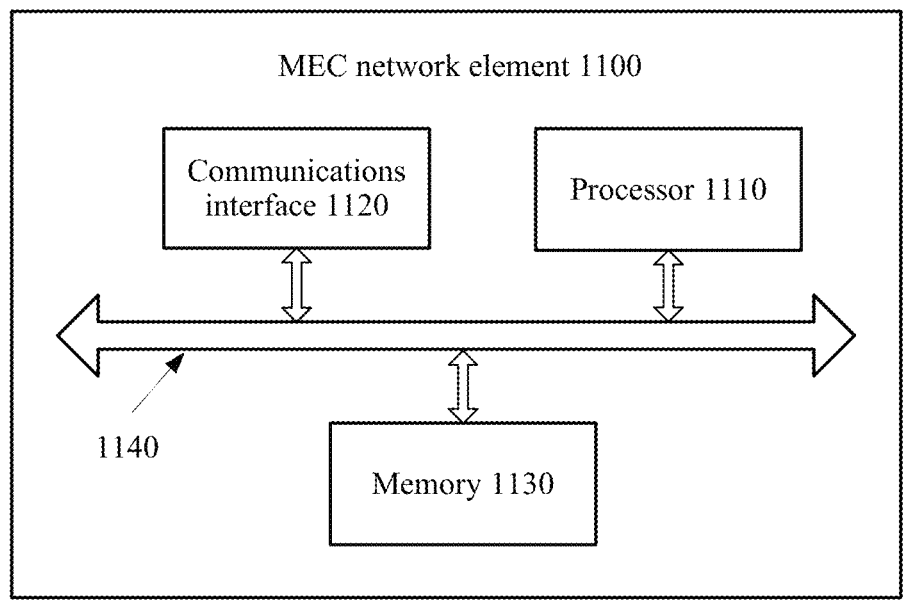
FIG. 11 is a schematic block diagram of another MEC network element according to an embodiment of the present invention.

When the processing unit 1010 is a processor, the communications unit 1020 is a communications interface, and the storage unit 1030 is a memory, the MEC network element in this embodiment of the present invention may be an MEC network element shown in FIG. 11.

As shown in FIG. 11, the MEC network element 1100 includes a processor 1110, a communications interface 1120, and a memory 1130. Optionally, the MEC network element 1100 may further include a bus 1140. The communications interface 1120, the processor 1110, and the memory 1130 may be connected to each other by using the bus 1140. The bus 1140 may be a PCI bus, an EISA bus, or the like. The bus 1140 may be categorized as an address bus, a data bus, a control bus, or the like. For ease of indication, the bus is indicated by using only one line in FIG. 11. However, it does not indicate that there is only one bus or only one type of bus.

The methods or algorithm steps described with reference to the content disclosed in the embodiments of the present invention may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a gateway device or a mobility management network element. Certainly, the processor and the storage medium may exist in the gateway device or the mobility management network element as discrete components.

A person of skill in the art should be aware that in one or more of the foregoing examples, the functions described in the embodiments of the present invention may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general or dedicated computer.

The objectives, technical solutions, and beneficial effects of the embodiments of the present invention are further described in detail in the foregoing specific embodiments. It should be understood that, the foregoing descriptions are only specific implementations of the embodiments of the present invention, but are not intended to limit the protection scope of the embodiments of the present invention. Any modification, equivalent replacement, or improvement made based on the technical solutions in the embodiments of the present invention shall fall within the protection scope of the embodiments of the present invention.

What is claimed is:

1. A communication method in a handover process, comprising:
   when a terminal is handed over from a source access network device to a target access network device, obtaining, by a gateway device, address information of the target access network device;
   obtaining, by the gateway device, address information of a Mobile Edge Computing (MEC) network element; and
   sending, by the gateway device, the address information of the target access network device to the MEC network element based on the address information of the MEC network element;
   receiving, by the MEC network element, the address information of the target access network device; and
   modifying, by the MEC network element stored address information of the source access network device to the address information of the target access network device, so that when the gateway device changes in a handover process, a connection between the MEC network element and the gateway device is established in time.

2. The communication method according to claim 1, wherein the gateway device is a target gateway device corresponding to the target access network device, and the method further comprises:
   sending, by the target gateway device, address information of the target gateway device to the MEC network element, so that the MEC network element modifies stored address information of a source gateway device corresponding to the source access network device to the address information of the target gateway device.

3. The communication method according to claim 1, wherein the obtaining, by the gateway device, address information of an MEC network element comprises:
   receiving, by the gateway device, the address information of the MEC network element sent by a mobility management network element.

4. The method according to claim 1, wherein the method further comprises:
   sending, by the gateway device, the address information of the MEC network element to the mobility management network element.

5. The communication method according to claim 1, wherein the obtaining, by the gateway device, address information of the target access network device comprises:
   receiving, by the gateway device, the address information of the target access network device sent by the mobility management network element.

6. A gateway device, comprising a processor, memory and a communications interface; wherein
   the processor is configured to execute instructions stored in the memory such that the processor, when executing the instructions, is caused to: when a terminal is handed over from a source access network device to a target access network device, obtain address information of the target access network device, obtain address information of a Mobile Edge Computing (MEC) network element, and send, based on the address information of the MEC network element by using the communications interface, the address information of the target access network device to the MEC network element, so that the MEC network element modifies stored address information of the source access network device to the address information of the target access network device.

7. The gateway device according to claim 6, wherein the gateway device is a target gateway device corresponding to the target access network device, and the processor is further configured to send address information of the target gateway device to the MEC network element by using the communications interface, so that the MEC network element modifies stored address information of a source gateway device corresponding to the source access network device to the address information of the target gateway device.

8. The gateway device according to claim 6, wherein the processor is further caused to receive, by using the communications interface, the address information of the MEC network element sent by a mobility management network element.

9. The gateway device according to claim 6, wherein the processor is further caused to send the address information of the MEC network element to the mobility management network element by using the communications interface.

10. The gateway device according to claim 6, wherein the processor is further caused to receive, by using the communications interface, the address information of the target access network device sent by the mobility management network element.

11. A Mobile Edge Computing (MEC) network element, comprising a processor, memory and a communications interface, wherein
   the processor is configured to execute instructions stored in the memory such that the processor, when executing the instructions, is caused: when a terminal is handed over from a source access network device to a target access network device, receive, by using the communications interface, address information of the target access network device sent by a gateway device; and modify stored address information of the source access network device to the address information of the target access network device.

12. The MEC network element according to claim 11, wherein the gateway device is a target gateway device corresponding to the target access network device, and the processor is further configured to: receive, by using the communications interface, address information of the target gateway device sent by the target gateway device, and modify stored address information of a source gateway device corresponding to the source access network device to the address information of the target gateway device.

* * * * *